United States Patent
Katoh et al.

(10) Patent No.: US 8,040,393 B2
(45) Date of Patent: Oct. 18, 2011

(54) IMAGE-PICKUP SIGNAL PROCESSOR AND METHOD OF DETECTING FLICKER

(75) Inventors: Katsumi Katoh, Kanagawa (JP); Eiji Machishima, Kanagawa (JP); Toshiaki Kodake, Kanagawa (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 11/725,283

(22) Filed: Mar. 19, 2007

(65) Prior Publication Data

US 2007/0182831 A1 Aug. 9, 2007

Related U.S. Application Data

(63) Continuation of application No. 10/294,376, filed on Nov. 14, 2002, now Pat. No. 7,248,289.

(30) Foreign Application Priority Data

Dec. 18, 2001 (JP) .................................. P2001-383942

(51) Int. Cl.
*H04N 9/73* (2006.01)
(52) U.S. Cl. ..................................... 348/228.1; 348/362
(58) Field of Classification Search ............... 348/222.1, 348/226.1, 227.1, 228.1, 362
See application file for complete search history.

(56) References Cited

U.S. PATENT DOCUMENTS

| | | | | |
|---|---|---|---|---|
| 5,293,238 A | * | 3/1994 | Nakano et al. | 348/226.1 |
| 6,501,518 B2 | * | 12/2002 | Smith et al. | 348/425.3 |
| 6,710,818 B1 | * | 3/2004 | Kasahara et al. | 348/607 |
| 7,009,642 B2 | * | 3/2006 | Hofer et al. | 348/226.1 |
| 2002/0158971 A1 | * | 10/2002 | Daiku et al. | 348/226.1 |
| 2004/0080630 A1 | * | 4/2004 | Kim | 348/226.1 |
| 2004/0201729 A1 | * | 10/2004 | Poplin et al. | 348/226.1 |

* cited by examiner

*Primary Examiner* — Lin Ye
*Assistant Examiner* — Chriss Yoder, III
(74) *Attorney, Agent, or Firm* — Robert J. Depke; Rockey, Depke & Lyons, LLC

(57) ABSTRACT

A plurality of flicker detection frames are formed by dividing an image into a plurality of frames. A flicker detection circuit performs detection of luminance data for each of the flicker detection frames. The differences between the luminance data of the preceding frame and the current frame, and between the luminance data of the current frame and the following frame with respect to each of the flicker detection frames are taken, a flicker component is extracted, and the flicker frequency is calculated, by a flicker frequency determination program in a microcomputer. Then, the space between the flicker detection frames in which a crest or trough of the extracted flicker component appears is measured, and the results are converted into the flicker frequency. The frame rate of the image pickup signals is controlled so as not to be synchronized with the flicker frequency.

7 Claims, 6 Drawing Sheets

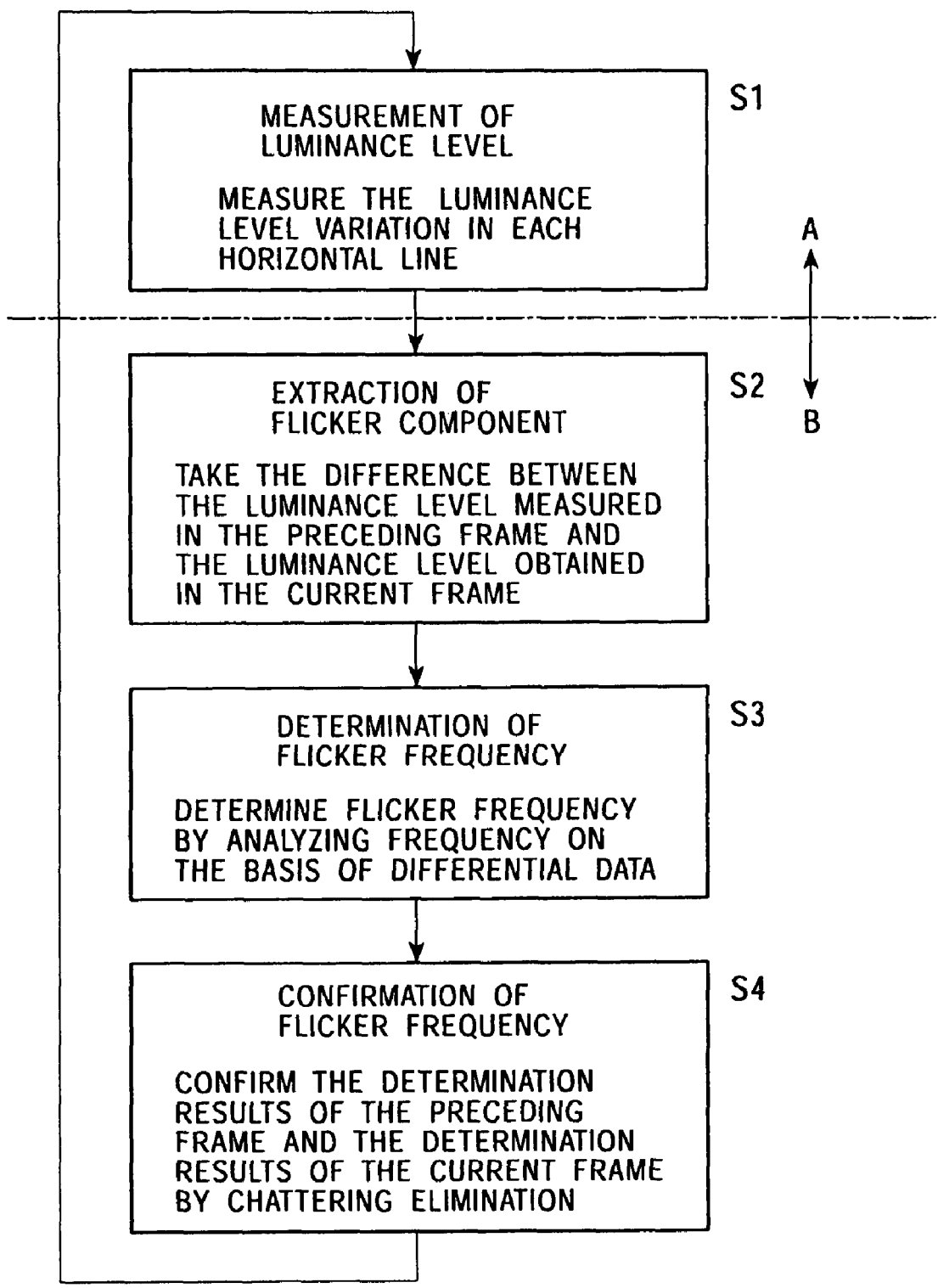

FIG. 5A
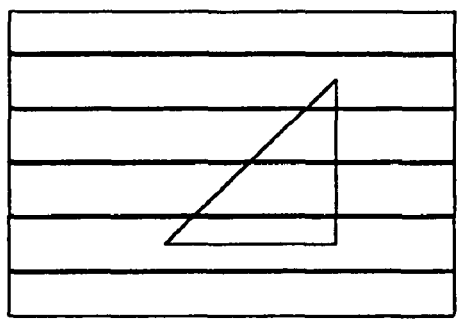
FIG. 5B
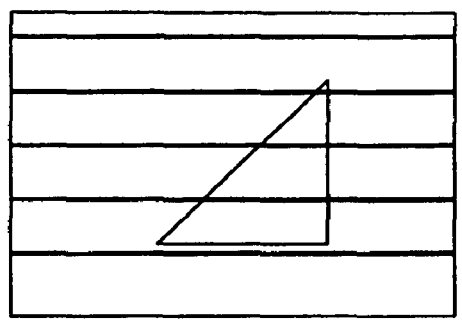
FIG. 5C
(a)
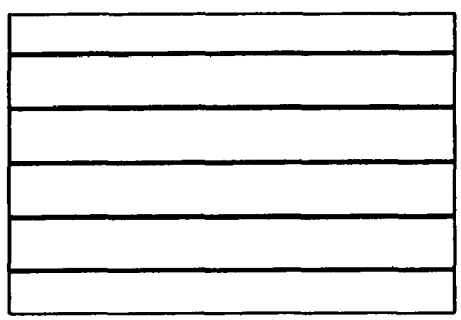
(b)
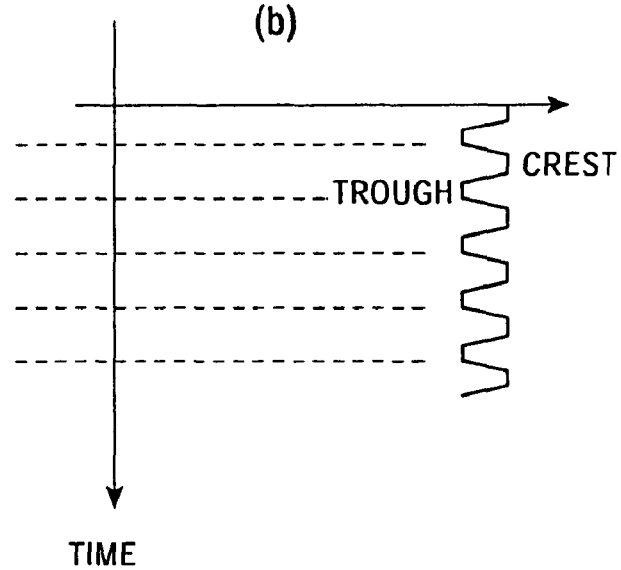

CONDITIONS: FRAME RATE = 15 FPS
NUMBER OF VISIBLE HORIZONTAL LINES = 288 LINES/
NUMBER OF INVISIBLE HORIZONTAL LINES = 42 LINES
50 Hz FLICKER

IMAGE-PICKUP SIGNAL PROCESSOR AND METHOD OF DETECTING FLICKER

The subject matter of application Ser. No. 10/294,376, now U.S. Pat. No. 7,248,289, issued Jul. 24, 2007, is incorporated herein by reference. The present application is a continuation of U.S. application Ser. No. 10/294,376, filed Nov. 14, 2002, now U.S. Pat. No. 7,248,289, issued Jul. 24, 2007, which claims priority to Japanese Patent Application No. JP 2001-383942, filed Dec. 18, 2001. The present application claims priority to these previously filed applications.

BACKGROUND OF THE INVENTION

1. Field of the Invention

The present invention relates to an image-pickup signal processor and a method of detecting flicker that, when taking pictures of objects by various types of image-pickup apparatuses, can effectively detect flickering of the images which is caused by frequency variation due to the power supply frequency of illuminating light rays and that can contribute to flicker elimination.

2. Description of the Related Art

So-called CMOS image sensors have hitherto been available.

In the CMOS image sensor, an image pickup area is formed by disposing a large number of photo sensors corresponding to image pickup pixels in a matrix pattern. The CMOS image sensor also has gating circuits for selectively reading out signal charges from the corresponding photo sensors. The gating circuit comprises a plurality of MOS transistors and is disposed at each pixel. Address scanners, which activate the gating circuit for the corresponding pixel and control the readout of the signal charges, are arranged in the vertical and horizontal directions in the CMOS image sensor.

In addition, the CMOS image sensor has shutter scanners accompanying the address scanners. The shutter scanner has an electronic shutter function that cancels signal charges remaining in the photo sensors prior to the charge storage time.

When an object is photographed using an image pickup apparatus that utilizes such a CMOS image sensor, for example, under a fluorescent lamp, the light rays of the fluorescent lamp include variations in the amount of light due to the frequency of the commercial power supply, which may appear as horizontal-striped flickering during image pick-up.

In order to solve this problem, various methods for detecting variations in the illuminating light rays, correcting picture signals by detecting signals, and eliminating flicker have been suggested.

However, in most of the known methods for correcting flicker, some kind of sensor for detecting flicker is used in the CMOS image sensor to electrically eliminate the flicker using the output of the sensor.

SUMMARY OF THE INVENTION

Accordingly, it is an object of the present invention to provide an image-pickup signal processor and a method of detecting flicker that can detect flicker simply by processing the image pickup signals, without providing a special sensor or circuit for flicker detection in a solid-state image pickup device, such as a CMOS image sensor.

In order to achieve the foregoing object, the present invention provides an image-pickup signal processor that receives image pickup signals output from a solid-state image pickup device and that outputs the signals after predetermined signal processing. The image-pickup signal processor includes a flicker detection circuit for performing flicker detection on the basis of a luminance signal included in the image pickup signals, and a microcomputer for detecting a flicker frequency from the data detected by the flicker detection circuit by using a flicker frequency determination program. An image is divided into a plurality of frames to form a plurality of flicker detection frames, luminance data for each of the flicker detection frames is detected, a flicker component is extracted by taking the differences between the luminance data of the preceding frame and the current frame, and between the luminance data of the current frame and the following frame with respect to each of the flicker detection frames, and the flicker frequency is calculated from the extracted data.

Also, the present invention provides a method of detecting flicker in an image-pickup signal processor for receiving image pickup signals that are output from a solid-state image pickup device and outputting the signals after predetermined signal processing. The method includes a detection step of forming a plurality of flicker detection frames by dividing an image into a plurality of frames and detecting luminance data for each of the flicker detection frames. The method also includes a calculation step of extracting a flicker component by taking the differences between the luminance data of the preceding frame and the current frame, and between the luminance data of the current frame and the following frame with respect to each of the flicker detection frames and calculating a flicker frequency from the extracted data.

Further, the present invention provides a computer-readable recording medium having stored therein a flicker frequency determination program for detecting the flicker frequency of image pickup signals output from a solid-state image pickup device. The program includes a flicker component extraction step of extracting a flicker component by taking the differences between the luminance data of the preceding frame and the current frame, and between the luminance data of the current frame and the following frame with respect to each of a plurality of flicker detection frames that are formed by dividing an image picked up by the solid-state image pickup device in a vertical scanning direction. The program also includes a frequency calculation step of calculating the flicker frequency from the extracted data obtained by the flicker component extraction step.

As described above, in an image-pickup signal processor and a method of detecting flicker according to the present invention, a plurality of flicker detection frames are formed by dividing an image into a plurality of frames. Luminance data for each of the flicker detection frames is detected. A flicker component is extracted by taking the differences between the luminance data of the preceding frame and the current frame, and between the luminance data of the current frame and the following frame with respect to each of the flicker detection frames. Then, the flicker frequency is calculated from the extracted data. Accordingly, the flicker frequency can be obtained using a simple and inexpensive configuration.

Consequently, flicker can be easily detected on the basis of the flicker frequency thus obtained. Therefore, flicker can be easily detected simply by processing the image pickup signals, without providing a special sensor or circuit for flicker detection in a solid-state image pickup device, thus contributing to high performance and low cost of a camera system using this type of method.

Also, the flicker frequency can be easily obtained using the simple and inexpensive configuration by controlling an image pickup apparatus by using a flicker frequency determination program, which performs the above-described processing, and a recording medium storing the flicker frequency determination program. Therefore, flicker can be easily detected, thus contributing to high performance and low cost of the camera system using this type of method.

BRIEF DESCRIPTION OF THE DRAWINGS

The present invention will become more apparent from the following detailed description of preferred embodiments thereof, when taken in conjunction with the accompanying drawings, in which:

FIG. 3 is a flowchart showing the overall process of flicker detection processing for the camera system shown in FIG. 1;

FIGS. 5A, 5B, and 5C are schematic illustrations for explaining flicker extraction processing in the camera system shown in FIG. 1.

DESCRIPTION OF THE PREFERRED EMBODIMENTS

An image-pickup signal processor and a method of detecting flicker according to the present invention will now be described with reference to embodiments according to the present invention.

The embodiments described below are preferable features of the present invention and will be described with various limitations that are technically preferable. In the description below, the scope of the present invention is, however, not limited to these embodiments, unless there is any description for limiting the present invention.

Figure 1:
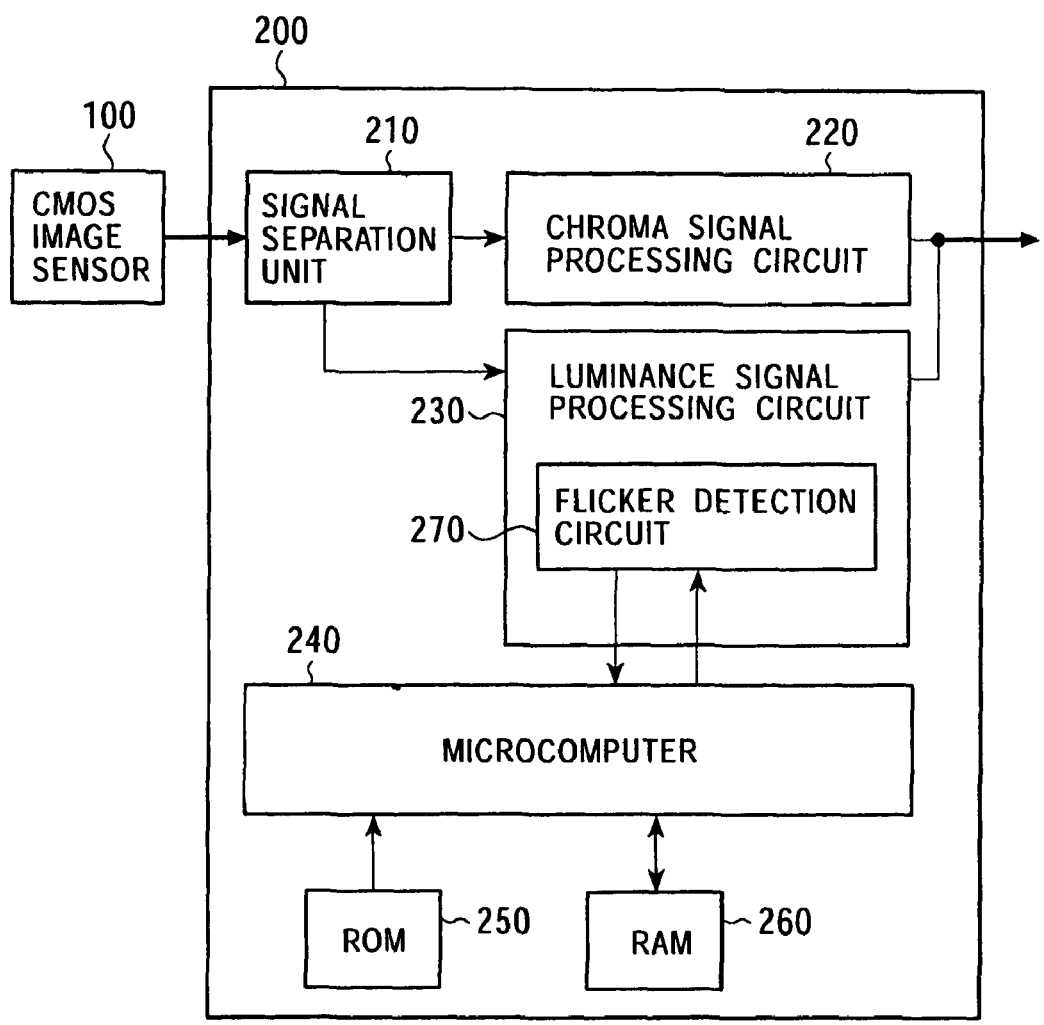
FIG. 1 is a block diagram showing the configuration of a camera system according to an embodiment of the present invention.

FIG. 1 is a block diagram showing an exemplary camera system according to an embodiment of the present invention.

The camera system in this embodiment includes a CMOS image sensor 100 functioning as an image pickup device. The camera system also includes a camera signal processor 200, which processes image pickup signals that are output from the CMOS image sensor 100 and which outputs camera signals. The camera signal processor 200 corresponds to the image-pickup signal processor of the present invention.

The camera signal processor 200 includes a signal separation unit 210, a chroma signal processing circuit 220, a luminance signal processing circuit 230, a microcomputer 240, a ROM 250, and a RAM 260. Furthermore, the luminance signal processing circuit 230 includes a flicker detection circuit 270.

The signal separation unit 210 separates the image pickup signals received from the CMOS image sensor 100 into chroma signals and luminance signals. The chroma signals are processed in the chroma signal processing circuit 220, and the luminance signals are processed in the luminance signal processing circuit 230. The processed signals are recombined and are output to a camera signal output unit (not shown) in a subsequent stage.

The flicker detection circuit 270 detects flicker from the luminance signals that are input to the luminance signal processing circuit 230.

The microcomputer 240 controls the overall system. In this embodiment, in particular, the microcomputer 240 performs processing described below to determine the flicker frequency using detection data obtained from the flicker detection circuit 270.

The ROM 250 stores a control program and the like for the microcomputer 240. In this embodiment, in particular, the ROM 250 stores a flicker frequency determination program for determining the flicker frequency using the microcomputer 240.

The RAM 260 stores various data to be processed in the microcomputer 240 and the like. In this embodiment, in particular, the RAM 260 provides an area for saving detection data of the preceding frame from the flicker detection circuit 270.

The basic principle of flicker detection will be now described.

Figure 2:
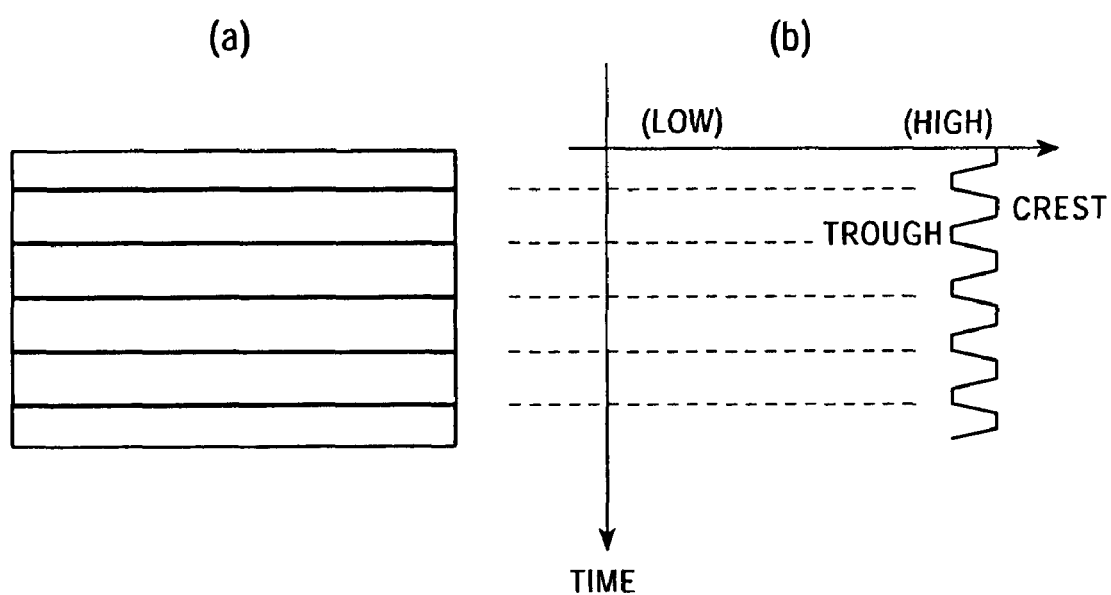
FIG. 2 includes illustrations for explaining flicker on the screen and luminance variation.

FIG. 2 includes illustrations for explaining flicker on the screen and luminance variation.

A flicker component shown in part (a) of FIG. 2 appears as a luminance variation, as shown in part (b) of FIG. 2. Also, the frequency of the luminance variation corresponds to the flicker frequency (power supply frequency of a fluorescent lamp).

Referring to part (a) of FIG. 2, parts in which a black band appears are low luminance (trough portion); parts in which a white band appears are high luminance (crest portion).

FIG. 3 is a flowchart showing the overall process of flicker detection according to this embodiment. The following processing is performed for each frame.

The flicker detection processing according to this embodiment includes measurement of Luminance Level (Step S1), extraction of a flicker component (Step S2), determination of flicker frequency (Step S3), and confirmation of the flicker frequency (Step S4).

In this embodiment, the step in portion A in FIG. 3 (Step S1) is implemented in hardware, and the other steps in portion B in FIG. 3 (Steps S2-S4) are implemented in software (the microcomputer 240 and the flicker frequency determination program).

However, the step in portion A in FIG. 3 is not necessarily implemented in hardware. The same procedure can be achieved by reading integrated values of luminance signals for each line into the microcomputer 240 and generating detection frame data by software.

These steps on the flicker detection processing according to this embodiment will now be described.

(1) Measurement of Luminance Level (Step S1)

Figure 4A:
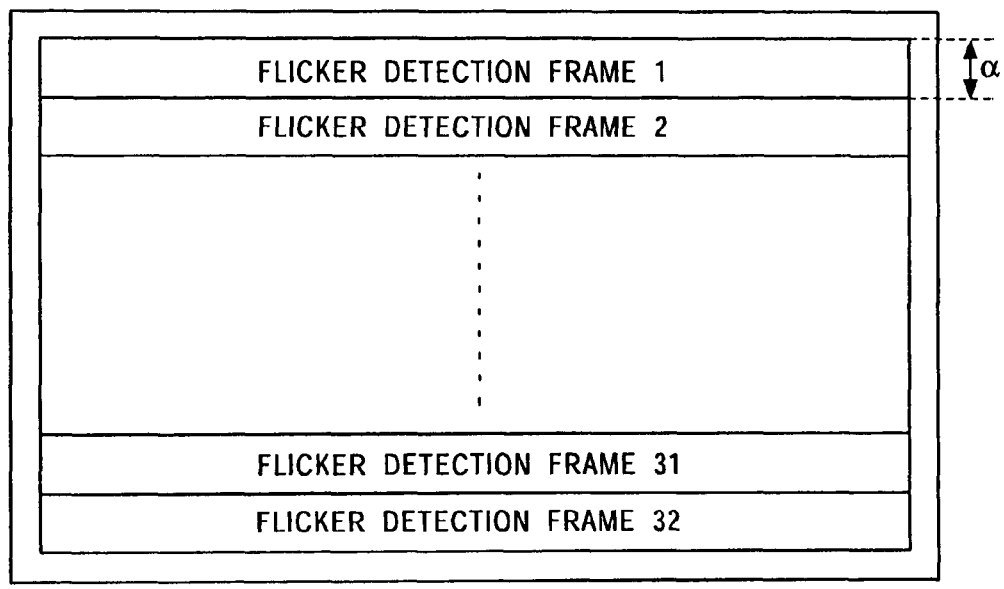
FIGS. 4A and 4B are illustrations for explaining the functional configuration of a flicker detection circuit in the camera system shown in FIG. 1.
Figure 4B:
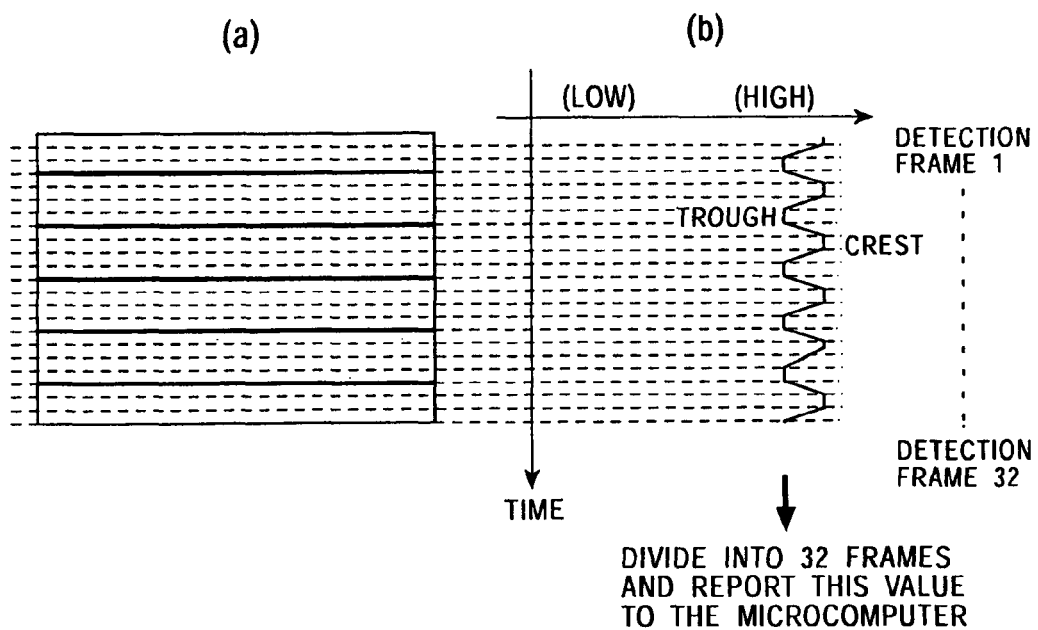

FIGS. 4A and 4B are schematic illustrations for explaining the function of the flicker detection circuit 270 having a mechanism for measuring the luminance level. FIG. 4A shows the configuration of flicker detection frames; and FIG. 4B shows flicker on the screen and the luminance variation.

FIGS. 4A and 4B show that the total number of flicker detection frames is 32 in this embodiment. This number is, however, merely an example. The total number may be any other figure.

Concerning the function of the flicker detection circuit 270, integration is performed with respect to the level of the luminance signal in each flicker detection frame designated by α in FIG. 4A. Then, measured luminance level for each frame is submitted to the microcomputer 240.

(2) Extraction of a Flicker Component (Step S2)

In step S2, only a flicker component is extracted by taking the difference between the data obtained from the flicker detection circuit 270 and the data obtained from the preceding frame in each flicker detection frame.

FIGS. 5A, 5B, and 5C are schematic illustrations of the extraction processing.

Here, the reason why only the flicker component remains is as follows: since the flicker in the preceding frame shown in FIG. 5A and the flicker in the current frame shown in FIG. 5B appear in different locations on the screen, only flicker spectra remain in the difference between these frames. In other words, if the data of the current frame is taken from the data of the preceding frame, the luminance level of an object disappears. Thus, only a luminance component of flicker remains, as shown in parts (a) and (b) of FIG. 5C.

Since the flicker component is extracted by such an operation, when the frame rate (the number of frames (pictures) per second) and the flicker frequency (the power supply frequency of a fluorescent lamp) are synchronized, the locations where flicker appears on the screen are fixed, thus undesirably causing the flicker component to disappear when the difference is taken.

In order to avoid this, an operation for providing a longer or shorter period of horizontal synchronization so that the frame rate increases or decreases slightly (approximately 1%) is performed in a camera signal processing circuit, thus causing the flicker component to appear.

A frame rate that synchronizes the flicker frequency will now be described.

This can be expressed as follows:

flicker frequency÷N[FPS], where N=1, 2, 3, 4, 5, . . . and FPS represents frames per second.

Specifically, the following values are obtained:
50 FPS, 25 FPS, . . . for 50 Hz flicker, and
60 FPS, 30 FPS, . . . for 60 Hz flicker.

(3). Determination of Flicker Frequency (Step S3)

Next, the three values for flicker frequencies (50 Hz, 60 Hz, and an indeterminable frequency) are determined from the flicker component extracted as described above.

(3-1) Flicker Characteristics Seen by the Program

Before determining the flicker frequency by the determination program, the program itself must understand how flicker is seen by the program.

The details given below can be used as variables, which are automatically calculated by the program itself as a preprocessing of the determination program. If conditions, such as the number of hardware detection frames, the frame rate, the number of horizontal lines, and the like, can be defined beforehand, the details below can also be used as constants by calculating them when the program is created.

1) Setting the width of and/or space between frames (setting the value of α in FIG. 4A)

Basically, the width of and/or space between frames is obtained by being equally divided by the number of frames of the overall screen. The setting value can be expressed as follows:

the width of and/or space between frames=the number of visible horizontal lines÷the number of frames.

For example, assuming that the number of frames is 32, and that the number of visible horizontal lines of the overall screen is 288, the width of and/or space between frames is 9. Here, the width of and/or space between frames is expressed in units of lines:

the width of and/or space between frames=288÷32=9 [lines]

2) Calculation of the number of crests (troughs) of a flicker component appearing on the screen The number of crests (troughs) is expressed as follows:

frame rate÷flicker period÷(the number of invisible lines+the number of visible lines)×the number of visible lines.

Here, an invisible horizontal line is a horizontal line that does not appear on the screen.

For example, assuming that the frame rate is 15 FPS (15 motion pictures per second) and that the number of visible lines and invisible lines are 288 and 42, respectively, in the case of 50 Hz flicker, the following expression can be obtained:

1/15÷1/100÷(288+42)×288=5.8

Also, for example, in the case of 60 Hz flicker under the above-mentioned conditions, the following expression can be obtained:

1/15÷1/120÷(288+42)×288=6.9

3) Calculation of space between frames in which crests (troughs) of flicker appear The space between frames in which crests (troughs) appear is expressed as follows:

the number of frames÷the number of crests (troughs) appearing on the screen.

Given that the above-mentioned examples in 1) and 2) are used, in the case of the 50 Hz flicker, the space is 32÷5.8=5.5. Thus, a crest (trough) appears every 5 or 6 detection frames.

In the case of the 60 Hz flicker, the space is 32÷7=4.5. Thus, a crest (trough) appears every 4 or 5 detection frames.

(3-2) Determination Logic and Programming

Determination logic will be described below on the basis of the above descriptions. The following examples of determination are based on the examples shown in section (3-1).

Procedure (1): determine whether or not flicker exists from the number of crests (troughs)

For example, in the case that flicker exists, 5 to 7 crests (troughs) should appear. Therefore, allowing for some margin, in the case that 4 to 8 crests (troughs) appear, the program determines that flicker exists or may exist. Then, the program performs Procedure (2). In the case that the number of crests (troughs) is other than 4 to 8, the program cannot determine whether or not flicker exists.

Procedure (2): determine whether or not a component that is neither 50 Hz nor 60 Hz is mixed on the basis of the space between crests (troughs)

For example, in the case that flicker exists, a crest (trough) should appear every 4 to 6 frames. Therefore, allowing for some margin, in the case that the number of crests (troughs) appearing at an interval other than every 4 to 6 frames is less than three, the program determines that flicker exists or may exist. Then, the program performs Procedure (3). In the other cases, the program cannot determine whether or not flicker exists.

Procedure (3): determine whether or not both 50 Hz and 60 Hz components are mixed on the basis of the space between crests (troughs)

For example, in the case that a crest (trough) appears every 4 frames and every 6 frames, both 50 Hz and 60 Hz components are mixed together. In this case, the program determines that the frequency cannot be determined. In the other cases, the program determines that flicker exists or may exist. Then, the program performs Procedure (4).

Procedure (4): Determine frequency on the basis of the space between crests (troughs)

For example, in the case of 50 Hz, 5 (5.8, according to the calculation results) crests (troughs) should appear, and a crest (trough) should appear every 5 or 6 (5.5, according to the calculation results) frames. Therefore, allowing for some margin, in the case that the number of crests (troughs) appearing every 5 or 6 frames is three or more, the program determines the frequency thereof to be 50 Hz.

For example, in the case of 60 Hz, 6 (6.9, according to the calculation results) crests (troughs) should appear, and a crest (trough) should appear every 4 or 5 (4.5, according to the calculation results) frames. Therefore, allowing for some margin, in the case that the number of crests (troughs) appearing every 4 or 5 frames is three or more, the program determines the frequency thereof to be 60 Hz.

For example, in cases that do not fall under the category of either of 50 Hz or 60 Hz, the program determines the frequency thereof cannot be determined.

Figure 6:
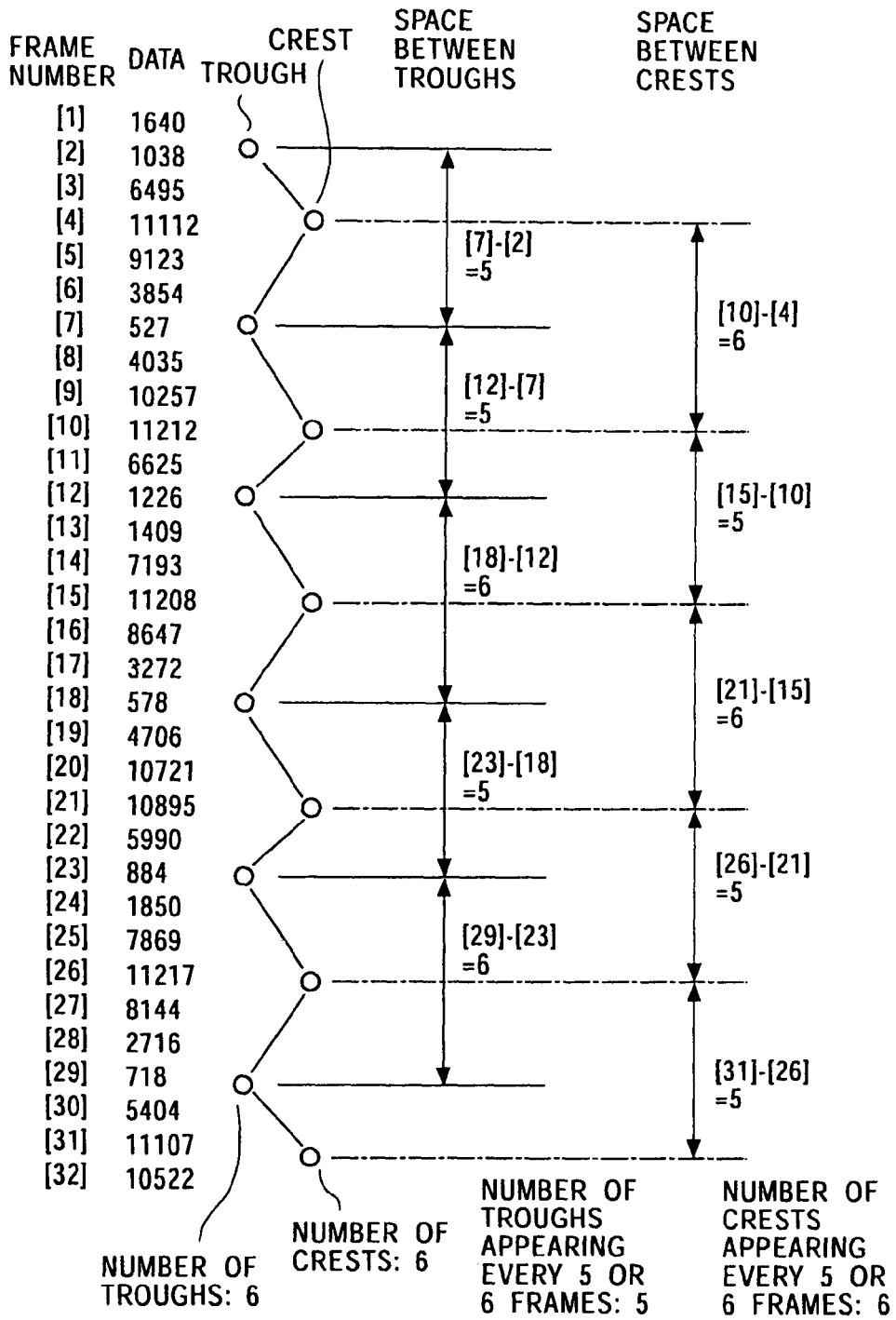
FIG. 6 is an illustration for explaining flicker frequency determination logic in the camera system shown in FIG. 1.

FIG. 6 is an illustration for explaining determination logic.

FIG. 6 shows an example of data analysis for 50 Hz flicker under the conditions used in the foregoing examples.

The following results can be obtained in accordance with the logic values.

Number of crests (troughs): 6

Space between crests (troughs): one crest (trough) every 5 or 6 frames (4) Confirmation of Flicker Frequency (Step S4)

In order to ensure the determination results obtained by the processing of (3) (Step S3) described above, the three values (50 Hz, 60 Hz, and an indeterminable frequency) are confirmed by chattering elimination.

For example, in the case that the same results are obtained three consecutive times, the results are confirmed.

Storing the number of times that identical results are consecutively obtained into a nonvolatile memory or the like enables adjustment of determination performance prior to delivery.

In this embodiment, Steps S2 to S4, which are implemented in software, are generally referred to as a "flicker frequency determination program". In addition, the "flicker frequency determination program" can include Step S1, as described above.

Accordingly, software that is executed by such a microcomputer is also included in the scope of the present invention. Furthermore, various recording media, such as a floppy disk, a hard disk, an optical disk, a semiconductor memory, and the like, which are readable by a computer that stores such software, are also included in the scope of the present invention.

In the above-mentioned camera system according to this embodiment, the following effects can be obtained.

(1) Determination of flicker frequency (power supply frequency of a fluorescent lamp) can be performed without providing any special sensor mechanism for flicker detection in a CMOS image sensor.

(2) The use of a microcomputer and a determination program as determination means eliminates the need for a special circuit (hardware algorithm) for determination. Consequently, determination can be realized at a relatively low cost.

(3) The flicker frequency determination program is characterized by being a specialized flicker frequency determination algorithm. The program is also characterized in that the program size is small so that an 8-bit microcomputer, which is small enough to be housed in a camera signal processing circuit, can perform determination.

More specifically, determination using an FFT transform (fast Fourier transform) or the like, which is generally known as a means of frequency analysis, requires an expensive MPU (microprocessing unit) or the like, which can calculate trigonometric functions and floating point operations at high speed. In the camera system, however, determination can be realized without using such an arrangement, thus allowing a simple and inexpensive method to be provided.

In practice, flicker is eliminated in a camera system using an electronic shutter mechanism and an AGC circuit on the basis of the flicker frequency detected as above described. The present invention, however, is characterized by detecting the flicker frequency. Thus, the description of the subsequent flicker elimination processing is omitted.

What is claimed is:

1. A method of detecting flicker in an image-pickup signal processor for receiving image pickup signals that are output from a solid-state image pickup device and outputting the signals after predetermined signal processing, the method comprising:
    dividing an image into a plurality of flicker detection frames and detecting luminance data for each of the flicker detection frames; and
    extracting flicker data by taking the differences between the luminance data of a preceding frame and a current frame, and between the luminance data of the current frame and a following frame with respect to each of the flicker detection frames;
    determining flicker components from a number of crests and/or troughs in the extracted flicker data; and
    calculating a flicker frequency from the extracted flicker components.

2. A method of detecting flicker according to claim 1, wherein the luminance data for each flicker detection frame of the image is measured.

3. A method of detecting flicker according to claim 1, wherein a width of and/or space between the flicker detection frames is arbitrarily set.

4. A method of detecting flicker according to claim 1, wherein the calculation of the flicker frequency is performed by software processing using a flicker frequency determination program in a microcomputer.

5. A method of detecting flicker according to claim 1, wherein the luminance data for each of the flicker detection frames is obtained and the flicker frequency is calculated by software processing using a flicker frequency determination program in a microcomputer.

6. A method of detecting flicker according to claim 1, wherein the image is divided in a vertical scanning direction.

7. A computer-readable recording medium having stored therein a flicker frequency determination program for detecting a flicker frequency of image pickup signals output from a solid-state image pickup device, the program comprising:
    extracting flicker data by taking differences between luminance data of a preceding frame and a current frame, and between luminance data of the current frame and a following frame with respect to each of a plurality of flicker detection frames that are formed by dividing an image picked up by the solid-state image pickup device;
    determining flicker components from a number of crests and/or troughs in the extracted flicker data; and
    calculating a flicker frequency from the extracted flicker components.

* * * * *